United States Patent [19]

Prusinski et al.

[11] 4,178,727

[45] Dec. 18, 1979

[54] HEAT ABSORBING PANEL

[75] Inventors: Richard C. Prusinski, Dearborn, Mich.; Timothy E. Johnson, Newton Center, Mass.

[73] Assignee: Architectural Research Corporation, Livonia, Mich.

[21] Appl. No.: 874,117

[22] Filed: Feb. 1, 1978

[51] Int. Cl.$^2$ .................... F24D 5/10; E04B 1/76
[52] U.S. Cl. ................. 52/173 R; 52/309.1; 52/309.4; 165/52; 165/DIG. 4; 165/DIG. 17; 428/913
[58] Field of Search ............... 52/173 R, 309.1, 309.4; 165/53, DIG. 4, DIG. 17; 428/913; 126/270

[56] References Cited

U.S. PATENT DOCUMENTS

| | | | |
|---|---|---|---|
| 2,625,930 | 1/1953 | Harris | 126/270 |
| 2,677,664 | 5/1954 | Telkes | 126/270 X |
| 2,690,653 | 10/1954 | Kleist | 165/DIG. 4 |
| 3,246,689 | 4/1966 | Remde et al. | 165/53 |
| 3,960,205 | 6/1976 | Lainge | 126/270 X |
| 4,003,426 | 1/1977 | Best et al. | 165/53 |

FOREIGN PATENT DOCUMENTS 2237143  2/1975  France ................... 126/270

OTHER PUBLICATIONS

Chemical Engineering News, Jan. 10, 1972, p. 40.

*Primary Examiner*—Alfred C. Perham
*Attorney, Agent, or Firm*—Whittemore, Hulbert & Belknap

[57] ABSTRACT

A heat absorbing panel is provided having an outer casing of resinous material intermixed with aggregate material. A central core is provided within the casing. The core includes substantial amounts of a phase change material having a melting point in the range of normal room temperature.

16 Claims, 4 Drawing Figures

HEAT ABSORBING PANEL

BACKGROUND OF THE INVENTION

In recent times, national attention has been focused upon methods to conserve energy resources, particularly fossil fuels which comprise a non-renewable source of energy. One of the principal possible sources of additional energy is energy received from the sun, commonly referred to as "solar energy." Recent attention has been directed to phase change materials, such as an aqueous mixture of glauber salts, as a material useful in collecting solar energy during sunlight hours and emitting such energy during the nighttime. Additionally, such phase change materials are capable of collecting excess heat energy which may occur in a building structure. Such phase change materials have the capability of being solid at normal room temperatures but melting at such normal room temperatures when subjected to the sun's rays to thereby absorb heat energy. Thus, during the daytime, the phase change material will absorb sun energy and other excess heat energy. During the nighttime, when there is no sun energy and the normal room temperature begins to decrease, the phase change material will revert from liquid back to solid and in the process emit the heat which was previously stored. Thus, the stored energy is given off during the nighttime when it is needed.

One problem with such phase change material has been that, being incongruent aqueous mixtures, there is a tendency for the constituents of the mixture to separate under the force of gravity after undergoing a few hundred freeze-thaw cycles. It has been learned, however, that if the mixture is contained in layers of about one-quarter inch or less, the number of freeze-thaw cycles which the material may undergo is greatly increased. Thus, it becomes practical to make the container for the phase change material in the form of a building element, such as a floor or ceiling tile in a house. When used as a floor tile, such a building element may absorb sun rays directly through windows and glass doors of a house during the day. Sunlight may be reflected to the ceiling tiles by means of a reflective louver device similar to an upside down venetian blind placed exteriorly of the house.

In accordance with the present invention, we have provided structures for incorporating such phase change materials into tiles, for use either as ceiling or floor tiles. This results in use of the tiles as building materials as well as for heat absorbing. Thus, the cost of the panels is prorated between two functions resulting in making them economically attractive.

SUMMARY OF THE INVENTION

A heat absorbing panel is provided comprising an outer casing of resinous material intermixed with an aggregate material. A central core is provided within the casing. The core includes substantial amounts of a phase change material having a melting point in the range of normal room temperature. The phase change material is confined in said core such that the confined material has a dimension not substantially greater than one-quarter inch in the vertical direction with respect to the intended orientation of the panel in use.

IN THE DRAWINGS

Figure 1:
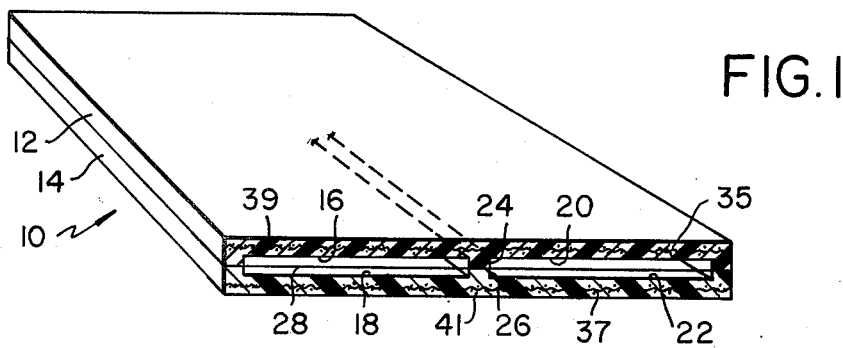
FIG. 1 is a view in perspective of a tile having a center core of phase change material in accordance with one embodiment of the present invention.
Figure 2:
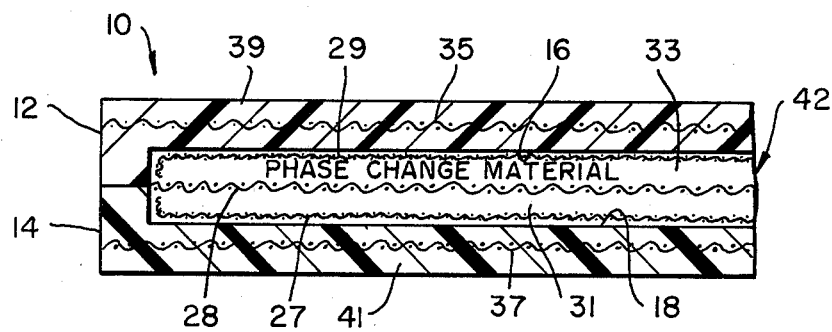
FIG. 2 is an enlarged view of the left section of the tile shown in FIG. 1.

FIGS. 1 and 2 illustrate a panel construction useful, for example, as a floor or ceiling tile in a room of a house or other building. The panel 10 comprises an outer resinous shell having finely divided aggregate material therein fabricated in two halves 12, 14, each of which has provided therein a pair of cavities 16, 18, 20, 22 separated by elongated divider portion 24, 26. After fabrication, the halves 12, 14 are adhered together to define the finished panel shell structure having a pair of internal sealed cavities. Encapsulated phase change material 42 is provided between the halves 12, 14 before they are adhered together. Alternately, the phase change material may be cast in place.

The panel halves 12, 14 are fabricated from a resin material having intermixed therein finely divided aggregate material, preferably in the amount of from 50 to 90% by volume, to form a dough-like mass. A preferred ratio is 85% aggregate and 15% resin, by volume.

A suitable resin for use in the invention may be a polyester resin. Polyester resins consist of the reaction product of a dibasic acid and a dihydric alcohol dissolved in a polymerizable monomer. The dibasic acids used in the resin solution may be phthalic anydride, iso-phthalic acids, adipic acid, tetra-phthalic anhydride, maleic acid, fumaric acid, or itaconic acid. The dihydric alcohols in the polyester resin solution may, for example, be any glycol such as ethylene glycol, propylene glycol, diethylene glycol, dipropylene glycol, or 1-3 butylene glycol. The polymerizable monomer used in the polyester resin solution can, for example, be styrene, vinyl toluene, methyl methacrylate, or dialyl phthalate.

Various aggregate materials can be intermixed in the resin as, for example, small miner particles, asbestos fibers, perlite, ground chalk, and fiber glass wool. The filler may be combined with suitable pigments to provide a desired color in finished tile.

The preferred aggregate material is small mineral particles. The particles may be, for example, sand, marble, granite, or the like. Silica sand is preferred. The mineral particles serve several functions. One of the most important is that the particles form an efficient heat transfer path between the outside surface of the panel and the phase change material. This reduces the hysterisis effect. In addition, the aggregate acts as an inexpensive fill. The aggregate also performs the function of reinforcing the resin to increase the overall strength of the tile. This permits use of thin wall sections to aid in heat transfer. The particles give the exterior surface of the tile a texture. The usual glossy appearance of a resin is considered objectionable in many applications. The desired texture is achieved as the result of the particles which are at or near the outer surface of the tile. The resin is corrosion resistant. Phase change materials are able to corrode metal or masonry materials. Also, the resin is water proof. Should the container of the phase change material break, the contents won't leak out.

By the intermixing of 50 to 90% aggregate material by volume, preferably 85%, with the resinous material, a dough-like mass is provided which may be worked or smoothed by hand with the use of a trowel similar to the manner of applying plaster or cement. Additionally, vibration techniques may be employed for applying the resin. With the percentage of aggregate used, there is an equalization of stresses when the resin cures and the surface remains smooth and the object formed thereby retains its strength.

As above mentioned, a polyester resin is the preferred resin to use in the present application. Other resins may be used as desired. However, whatever is used must be liquid impervious, that is, capable of sealing interiorly thereof the liquid phase of the phase change material.

A foraminous sheet 35, 37, preferably of woven glass fiber, is provided approximately centrally of each of the horizontal walls 39, 41 of the panel halves 12, 14 coextensive therewith. The sheets 35, 37 are laid out smooth so that there are no wrinkles or bubbles. Such wrinkles or bubbles would tend to cause delamination. Portions of the resin penetrate the sheets 35, 37 to cause adherence of the resin through the sheets. The sheets 35, 37 significantly increase the strength of the panels.

The phase change material is preferably an incongruent aqueous mixture of, for example, glauber salts. A thickening agent may be added to the salts to prevent the mixture from settling out and to increase heat absorbing efficiency. For example, an interlocking, thixotropic finely divided fumed silica may be used as thickener. Suitable thickening occurs when 4% is added. Glauber salt is the crystalline decahydrate $Na_2SO_4.H_2O$ of sodium sulphate. It occurs naturally as mirabilite, and is also obtained from salt cake. Sodium chloride may also be added to the mixture to set the desired melting point. Borax may be added also as a nucleating agent.

This material preferably has a melting temperature in the range of normal room temperature. For example, if normal room temperature is thought of as being 72° Fahrenheit, the phase change material may be formulated to melt at a constant temperature of 74° F. When sunlight falls on the panel, the absorbed heat is conducted through the polyester shell to the phase change material at the core which absorbs the heat latently as it melts. At night the material resolidifies, releasing the absorbed heat at near constant temperature.

The panels are also useful for cooling. In some commercial buildings, it is necessary to use air conditioners for cooling even in the winter because of heat emitted by bodies, lights and office machines. The panels reduce the load on the air conditioners during the day and warm the building at night.

Figure 4:
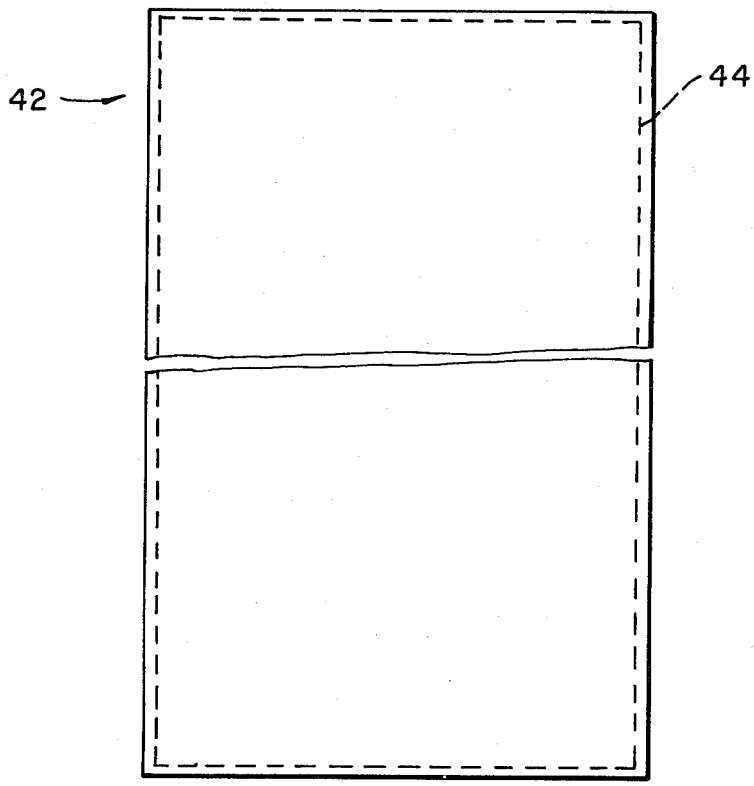
FIG. 4 is a plan view of a phase change material encapsulated in a container.

As will be noted in FIGS. 1 and 4, the encapsulated phase change material 42 includes a container of flexible water impervious material comprising upper and lower walls 27, 29 and a central wall 28 thus dividing the container into two chambers, each of which is filled with phase change material 31, 33. The walls 27, 28, 29 are fabricated of thin metal foil sheet aluminum of about 5 mils thickness. The interior surfaces of the sheet may be covered with a plastic. The marginal edges are heat sealed at 44 to make the interior chambers water-tight. The chambers are about one-quarter inch thick so that the layers of phase change material will have this thickness. It has been found necessary to so encapsulate the phase change material to insure that there is no water loss from the phase change material. The resin mixture may have very minute holes which would eventually permit some water loss.

The panels may be made any desired size. For example, the panels may be two feet square, which is considered to be a desirable size having good applicable strength for handling, hanging or laying purposes. However, smaller sizes may be used if desired as, for example, the conventional twelve inch square used as ceiling tiles.

The thickness of the panel is constrained by the nature of the phase change material. As shown in FIG. 2, the distance between the upper and lower interior surfaces of halves 12, 14 and the wall 28 should not exceed one-quarter inch when salts which are prone to settle are used to and from the phase change material. The wall thickness of the tile should also be in a range permitting ready transfer of heat to and from the phase change material. For example, the wall thickness may also be about one-quarter inch.

Figure 3:
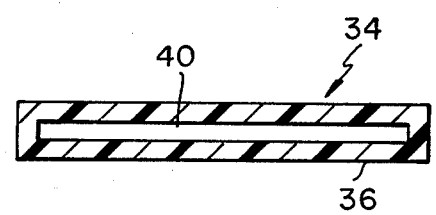
FIG. 3 is a sectional view of phase change material encapsulated within a thin foil-covered plastic container used in forming the core of a tile.

FIG. 3 illustrates another capsule of phase change material which may be cast or laid into the tile 10 during the formation thereof. The capsule 34 comprises a plastic container 36 which defines an interior sealed cavity which is filled with phase change material 40. The container 36 may be fabricated of, for example, polyethylene resin. The wall thickness thereof is preferably relatively thin so as to readily permit heat transfer. For example, a wall thickness of one-thirty-second of an inch is suitable. Again, the vertical thickness of the cavity should not exceed one-quarter inch because beyond this dimension, the constituents of certain phase change material tend to settle out as a consequence of gravity after a limited number of freeze-thaw cycles.

Having thus described our invention, we claim:

1. A rigid heat absorbing panel comprising an outer casing of resinous material, a central core within said casing including at least one water-tight capsule, and a substantial amount of phase change material having a melting point in the range of normal room temperature in said water-tight capsule.

2. A heat absorbing panel as in claim 1, said phase change material being confined in said core such that the confined material has a dimension not substantially exceeding one-quarter inch in the vertical direction with respect to the intended orientation of the panel in use.

3. A heat absorbing panel as defined in claim 1, further characterized in that said phase change material is a liquid mixture of glauber salt.

4. A heat absorbing panel as defined in claim 1, further characterized in that said capsule is substantially elongated and relatively thin and defines a single central cavity.

5. A heat absorbing panel as in claim 1, further characterized in that aggregate material is intermixed with said resin in a ratio of about 50 to 90% aggregate and 50 to 10% resin, by volume.

6. A heat absorbing panel as in claim 1, further characterized in that said aggregate material is intermixed with said resin in an amount of about 85% aggregate and 15% resin, by volume.

7. A heat absorbing panel as in claim 1, further characterized in that said outer casing includes oppositely disposed wall portions defining the vertical limits of said core, said wall portions being no more than three-eights of an inch thick.

8. A heat absorbing panel as in claim 1, further characterized in that said capsule defines a pair of central cavities each having a dimension not substantially exceeding one-quarter inch in the vertical direction with respect to the intended orientation of the panel in use.

9. A heat absorbing panel as in claim 7, further characterized in the provision of a foraminous sheet encased in each of said oppositely disposed wall portions and coextensive therewith.

10. A rigid building panel comprising an outer casing including an upper half and a lower half both of which have a plurality of recesses therein, the recesses in the bottom half opening toward and being aligned with the recesses in the upper half, whereby with the upper half and the lower half of the outer casing secured together the recesses form individual cavities within a complete building panel, at least one water-tight capsule within each cavity, and a substantial amount of phase change material within each water-tight capsule.

11. A building panel as set forth in claim 10 wherein the outer casing is formed of resin and aggregate in a ratio of 50 to 90% aggregate and 50 to 10% resin, by volume.

12. A building panel as set forth in claim 11 wherein the walls of said outer casing are not greater than three-eighths of an inch thick.

13. A building panel as set forth in claim 12 and further including a foraminous sheet positioned in opposite walls of the outer casing substantially centrally of said walls.

14. A building panel as set forth in claim 10 wherein the phase change material is a liquid mixture of glauber salt and a thickening agent.

15. A building panel as set forth in claim 10 wherein there are a number of capsules in each cavity having a thickness of not greater than one-quarter inch.

16. A building panel as set forth in claim 15 wherein there are two capsules in each cavity provided by an aluminum foil of approximately five mills thickness including a single central wall and an interior coating of plastic material.

* * * * *